United States Patent Office 3,422,186
Patented Jan. 14, 1969

3,422,186
METHODS FOR THE REMOVAL OF CERUMEN AND THE METHODS FOR THE TREATMENT OF EAR DISEASE
Ernest J. Sasmor, Yonkers, N.Y., assignor to The Purdue Frederick Company, Yonkers, N.Y., a corporation of New York
No Drawing. Continuation-in-part of application Ser. No. 384,786, July 23, 1964, which is a continuation-in-part of Ser. No. 214,803, Aug. 6, 1962. This application Apr. 5, 1967, Ser. No. 628,562
U.S. Cl. 424—79    9 Claims
Int. Cl. A61k 25/00

ABSTRACT OF THE DISCLOSURE

Pharmaceutical cerumenolytic and aural therapeutic preparations comprising ethylene oxide-polyoxypropyleneglycol condensate, a water-miscible viscous vehicle, as for example, propyleneglycol, glycerin, or polyoxyethyleneglycol, which may contain in addition, pharmacologically active therapeutic substances, as for example, hydrocortisone, an antibiotic or an analgesic agent and which may be used as a therapeutic agent in removing cerumen or treating ear disease in humans and animals.

---

This application is a continuation-in-part of applicant's co-pending application Ser. No. 384,786, filed July 23, 1964, which in turn was a continuation-in-part of applicant's then co-pending application Ser. No. 214,803, filed Aug. 6, 1962, now abandoned.

This invention relates to new cerumenolytic as well as aural therapeutic preparations and a method of using these preparations for the removal of ear wax and for the treatment of otitis externa or otitis media.

Cerumen is a peculiar and unique exudate of both the normal and diseased ear canal which actively inhibits and interferes with the action of medications, as well as giving rise to active aural symptomatology which may be disturbing and painful to the patient. Cerumen markedly reduces the effectiveness of germicidal, antiseptic and other therapeutic substances in the ear as well as acting to support the growth of certain micro-organisms. Itching, pain, a sense of fullness, noises and even loss of hearing may result from impacted cerumen. Occlusion of the ear drum may occur quite suddenly by water entering the ear canal causing the wax to swell. This is frequently the case in individuals who submerge their heads in water during bathing, and tinnitus and even vertigo has been known to result because of the pressures developed.

Removal of impacted cerumen is often a difficult procedure, and in instances where the ear wax has accumulated over a period of time, often requires mechanical or surgical manipulation for its disintegration and consequent removal. The prophylactic value of the removal of hardened ear wax has been pointed out by many investigators and is frequently the cause of common otologic complaints since the accumulation of the debris and wax in the ear canal macerates and irritates the tissue making it more susceptible to disease. It has been shown that external otitis, including eczematous lesions of the external ear, is frequently related to ear wax accumulation.

Therapy of inflammatory diseases of the external and middle ear present problems which are greatly complicated by the anatomic and physiologic peculiarities of the human ear canal. The contiguity of the middle ear structures makes them both vulnerable to damage and accessible for treatment through the external auditory canal. Thus, the structural and secretory peculiarities of the external and middle ear indicates the need for topical application, either solely or adjunctively, in the management of otitis.

Antibiotic instillations, however, may be of little value if they are not brought into contact with the infected area. This contact may be prevented by the barrier set up by the admixture of exudates, cerumen, and epithelial debris. A topical otologic medication, therefore, should have a particularly high penetration index in order to bring the antibiotics into intimate contact with the infected tissue and the infecting organisms. It follows, therefore, that successful topical therapy of otitis must include maintenance of antibiotic contact with the affected area by penetration and disorganization of the ceruminous-exudative barrier, reduction of the inflammation and relief of pain and itching, and restoration of the acid mantle of the skin of the external auditory canal. The present invention provides an effective method for topically treating a diseased ear canal to minimize and even control the infection while permitting the cerumen to be softened and removed.

Using a new cerumenolytic preparation comprising a water-miscible hygroscopic solvent, such as propylene glycol, glycerin or polyoxyethylene glycol, and in which there is dissolved from about 5 to 20 milligrams per milliliter of a high molecular weight nonionic surfactant prepared by condensing ethylene oxide with polyoxypropylene glycol, i.e., ethyleneoxidepolyoxypropyleneglycol condensate, we found that it is possible to soften and remove the cerumen from an ear canal. Moreover, by adding a therapeutically active concentration of an antibiotic to this cerumenolytic preparation, it is possible to not only soften and remove cerumen from a diseased ear canal, but to obtain maximum therapeutic relief of the accompanying otitis merely by topically applying the preparation to the external auditory canal. Other pharmacologically active compounds such as anti-inflammatory agents, anti-pruritic, antiseptic and local anesthetic drugs may also be added to the cerumenolytic solution for instillation into the ear in order to provide an improved means of treating ear disease. The lowered interfacial tension as well as the surface film properties provides a high order of penetration for these therapeutic ear solutions, resulting in a sustained and prolonged contact of the medicament with the affected area. This improved effect is accomplished even in the presence of cerumen, pus and tissue exudate.

Accordingly, the invention provides an improved cerumenolytic preparation for instillation into the ear, comprising a pharmaceutically acceptable water-miscible hygroscopic solvent such as one selected from the group consisting of propylene glycol, glycerin and polyoxyethylene glycol, and in which there is dissolved from 5 to 30 milligrams per milliliter of a high molecular weight nonionic surfactant having a total molecular weight of about 8750, which is known in commerce under the trade name of "Pluronic F–68." The new compositions are formulated by dissolving from 5 to 30 mg. per milliliter of solution of the ethylene oxide polyoxypropylene condensate (Pluronic F–68), in a hygroscopic solvent, such as propylene glycol, glycerin or polyoxyethyleneglycol, to which may be added small amounts of water (in the range of from 0.05 to 0.2 ml. of water, per ml. of solution), in order to adjust the viscosity of the solution. To this solution may be added an antibiotic, anti-inflammatory agent, antiseptic agent, or an analgesic agent.

The type and concentration of the therapeutic agent which may be incorporated in the preparation may vary, dependent upon the organism isolated from the diseased ear to be treated or the pathology presented. Particularly satisfactory results may be obtained in the treatment of a large cross-section of patients using such broad-spectrum antibiotics as polymyxin B., U.S.P., neomycin, U.S.P., tetracycline, U.S.P., dihydrostreptomycin, U.S.P., tyrothricin, N.F., oxytetracycline, N.F., chloramphenicol, U.S.P., and chlortetracycline, N.F., any one or more of which may be used in the cerumenolytic preparation of the invention in such therapeutically active concentrations as conditions require. When antibiotics are added to the cerumenolytic preparation, all the precautions necessary to preserve the stability of the particular compound selected, should be observed. Thus, when the glycols are used as a solvent in the preparation of the cerumenolytic therapeutic solution, then these vehicles should be substantially free of aldehydes and peroxides.

In addition to the antibiotics, various other medicaments may be incorporated in the new cerumenolytic preparations of the invention, including antipruritic or anti-inflammatory agents, such as hydrocortisone alcohol, prednisolone, glycyrrhetinic acid and antipyrine; antiseptics, such as chlorbutanol and hexachlorophene. Analgesic agents such as choline salicylate, N-methylglucammonium salicylate, or salicylamide, may also be included in the above composition when it is desired to provide an analgesic effect in addition to the other properties of the therapeutic solution.

When it is desired to incorporate an anti-inflammatory substance such as hydrocortisone alcohol or prednisolone into the therapeutic solution consisting of ethylene oxide polyoxypropyleneglycol condensate and the viscous solvent, a particular advantage occurs in that a true solution is obtained, rather than the conventional suspension. This solubilizing property of the solution results in an augmented synergistic therapeutic action, which provides a superior anti-inflammatory effect than that which is obtained with the suspension.

Ethylene oxide polyoxypropyleneglycol condensate (Pluronic F-68), is a known substance and has been used in certain pharmaceutical preparations (see, Goyan et al., U.S. Patent 2,975,099, Mar. 14, 1961), as for example in a suppository base, but it has never been utilized for the purposes herein described to remove cerumen from the ear. The use of ethylene oxide polyoxypropyleneglycol condensate for the purpose of removing cerumen is to be distinguished from the use of the aforesaid compound in dermatologic preparations, since its purpose in a cerumenolytic preparation is patentably distinct from its role in a vehicle intended as a carrier for medication. In a cerumenolytic preparation the problem is that of achieving a disorganization of the ceruminous material which clogs the ear and which is not subject to emulsification. The ceruminous placque consists of a mixture of protein and fat, which materials are insoluble in water and generally are resistant to emulsification processes. It was found that the composition of the ethylene oxide polyoxypropyleneglycol condensate in the viscous, water-miscible solvent, was capable of solubilizing such ceruminous material without the process of either emulsification or complex formation, as has been reported for other known cerumenolytic preparations. Thus, Halpern, in U.S. Patent 2,914,442, showed that the ceruminous placque may be disorganized by complexing a surfactant agent, triethanolamine polypeptide oleate condensate, with the protein material of the cerumen, and that this complexing was distinct from the surface tension lowering properties of the compound. It has since been generally recognized that the lowering of surface tension is of little effect in the removal of cerumen unless complexing occurs. The present composition is to be distinguished in its mechanism of cerumenolysis from the preparations described by Halpern, in that no binding or complexing takes place, but that its action results from the solubilization of the lipid components of the cerumen. This absence of binding or complexing was established through the use of the conventional conductance analytical procedure which demonstrated that the triethanolamine polypeptide oleate condensate complexes with both albumin, a typical natural protein and glycerol-monostearate, a typical natural fat. Furthermore, it was demonstrated that in addition to the protein-binding capacity of the triethanolamine polypeptide oleate condensate, a specific solubilizing action on fat was observed, so that the amount of insoluble glycerol-monostearate remaining in the aqueous medium after the addition of the triethanolamine polypeptide oleate condensate was reduced by about 25 percent, indicating a pronounced solubilizing action. When the ethylene oxide polyoxypropylene glycol condensate was studied for its effect on solubilization of fat, such as glycerol-monostearate, no change was observed, when compared with the control preparation. The complexing shown by the conductance measurements of triethanolamine polypeptide oleate condensate, and a protein (albumin) together with the weight of undissolved fat (glycerolmonostearate), remaining after exposure to the surfactant compound, clearly establishes that the triethanolamine polypeptide oleate condensate is capable of both solvating and binding fats and proteins. It would be expected that ethylene oxide polyoxypropylene glycol condensate, a surfactant compound, would be capable of similar fat solubilization through micelle formation, but this property was unexpectedly absent. The results presented in Table 1 demonstrate the binding capacity of triethanolamine polypeptide oleate condensate and the lack of binding property of the ethylene oxide polyoxypropylene glycol with the protein and fat and clearly demonstrate the unexpected behavior of the latter compound in contrast to the behavior of the former compound.

TABLE 1.—CONDUCTANCE MEASUREMENTS OF TRIETHANOLAMINE POLYPEPTIDE OLEATE CONDENSATE (I) AND ETHYLENE OXIDE POLYOXYPROPYLENE GLYCOL (II) WITH ALBUMIN AND GLYCEROL-MONO-STEARATE*

| Compound | Concn., percent | pH[1] | Resistance (ohms) | Conductance (mhos) |
|---|---|---|---|---|
| (I) | 2 | 7.45 | 95.5 | 10,500 |
| (I) plus albumin | [2] 2 | 7.40 | 130 | 7,700 |
| (I) plus Gly. M.S.[3] | [2] 2 | 7.85 | 198 | 5,010 |
| (II) | 2 | 6.90 | 4,000 | 250 |
| (II) plus albumin | [2] 2 | 5.35 | 205 | 4,900 |
| (II) plus Gly. M.S.[3] | [2] 2 | 6.25 | 4,310 | 241 |
| Albumin | 2 | 5.40 | 195 | 5,150 |
| Gly. M.S.[3] | 2 | 7.00 | 14,350 | 69.5 |

*Conductance measurements were obtained with a standard Wheatstone bridge with a 2A research electrode.
[1] No interpretation of pH values is given.
[2] The concentration was 2% for each ingredient.
[3] Gly. M.S. = Glycerol monostearate.

Removal of cerumen with the cerumenolytic preparation of the present invention simply requires instilling of at least 1 to 5 drops of the preparation into the ear canal. After topical instillation into the external orifice of the ear, it should be plugged with cotton to allow the cerumenolytic preparation to penetrate the cerumen in the ear canal. If a wet dressing is desired, a wick saturated with the cerumenolytic preparation should be inserted into the canal of the ear being treated.

To illustrate the ease with which cerumen may be removed using the unique cerumenolytic preparation of the present invention, a series of clinical investigations were conducted in 76 patients. In each of these tests, the patients were treated with a cerumenolytic preparation, which consisted of a solution of propylene glycol in which there was dissolved 0.1 milliliter of glycerin, 0.1 milliliter of distilled water, 5 milligrams of chlorbutanol and 12.5 milligrams of Pluronic F-68 (a representative number of the group of ethylene oxide-polyoxypropylene glycol condensates). The medication was administered by instillation of the solution into the ear canal and then, stoppering with a plug of cotton. The solution was allowed to remain in situ over a period of time, ranging from 10 minutes to overnight, depending upon the amount and degree of hardness of the cerumen present and then the ear canal was gently flushed with water.

On examining the ears after treatment, it was found that 51.2 percent of the group had complete removal of cerumen; 36 percent showed substantial clearance of cerumen, and 11.2 percent showed partial clearance of the cerumen in the ear canal. In 1.6 percent (2 patients) there was no change observed when compared to the pretreatment status. In all of these tests, there was no evidence of any local irritation or individual sensitivity observed.

In the treatment of ear disease such as otitis externa, a fundamental problem exists in the barrier to the therapeutic agents which is caused by cerumen. The cerumen obliterates the ear canal and serves both as a pocket for infectious organisms, as well as to prevent the contact with the affected area by the therapeutic agents. It is for this reason, that otitis externa is a very difficult disease to treat and results in a high rate of failure with the conventional medications. When the therapeutic agent is combined with the conventional otologic vehicle, a suspension results which further limits the penetration of the active substance, thereby diminishing the therapeutic potency of the preparation. In contrast to this, it was found that hydrocortisone and antibiotics, as for example, neomycin undecylenate, are particularly soluble in the new cerumenolytic solution to result in a clear, therapeutic preparation which readily penetrates the ceruminous placque to result in a high rate of effectiveness.

A pharmaceutical preparation containing:

| | Percent |
|---|---|
| Tyrothricin | 0.1 |
| Neomycin undecylenate | 0.067 |
| Hydrocortisone alcohol | 0.1 |
| Ethylene oxide polyoxypropyleneglycol condensate | 1 |
| Distilled water | 10 |
| Propylene glycol, q.s. | 100 | was found to be particularly advantageous in treating otitis externa and ear infections such as otitis media, which hitherto presented a problem in that the ceruminous placque provided a barrier to therapy.

In clinical trials to establish the safety and effectiveness of this new preparation containing neomycin undecylenate, tryrothricin, hydrocortisone, ethylene oxide polyoxypropylene glycol condensate in propylene glycol solution, in treating ear infections in animals, the new composition was administered by 16 investigators to 235 dogs and 22 cats with various otitic conditions. Ages of the dogs ranged from three months to 16 years. Thirty-six were less than one year old and 26 were more than 10 years old. Among them were 61 Spaniels (Cocker, Springer, and Brittany); 31 French Poodles; 15 Dachshunds; 15 Beagles; 15 Terriers (Welsh, Spitzbergen, Scottish, Boston, Wirehaired, Kerry Blue and Fox); and eleven German Shepherds. There were also scattered representatives of 17 other breeds and 34 dogs of mixed breed. In 113 dogs, the conditions treated were bilateral, and 6 ears were treated twice for recurrent infections. Hospital and outpatient treatment, and combinations of the two, were included in the trials.

Two hundred and twenty-seven dogs (344 ears) were treated for otitis externa. The condition was diagnosed or described as chronic by the investigators in 89 dogs (140 ears), and as acute in 138 dogs (204 ears). Purulent, ceruminous, and ulcerative types of the disease were included. There was tympanic involvement in many, and infestation with mites was associated with the infection in 62 ears. In the 9 dogs (10 ears) treated adjunctively for otitis media, the tympanum was observed to be perforated in three and destroyed in one, prior to start of therapy.

In the 22 cats, (28 ears), mites were associated with otitis externa in 13. In ten of these 13, the test solution was the sole agent employed.

In these preliminary trials, 2 to 25 drops were administered from one to four times daily, depending in part upon the severity and extent of the lesion, and in part upon the size of the meatus of the auditory canal. Most doses were 10 drops or less, the larger doses being used mainly in early trials. As administered, there appeared to be no significant difference in effectiveness at the various dosage levels in either acute or chronic conditions. Concomitant fungicides, miticides, and systemic antibiotics and steroids were administered when indicated, though in 28 of 30 dogs with otitis externa associated with mite infestation the test preparation was the sole agent employed. In most cases excessive hair was eliminated, and cerumen and exudate were removed by irrigation and other procedures for debridement prior to therapy.

The results of therapy are shown in Table 2. In chronic otitis external in dogs, Good to Excellent results (marked improvement to complete clearing) were obtained in 99 (70.7 percent) of 140 ears (6 ears were treated twice for recurrent conditions); Fair results (moderate improvement in 13 ears (9.3 percent)). In acuate otitis externa Good to Excellent results were obtained in 183 ears (89.7 percent) of 204 ears, Fair results in 6 ears (2.9 percent). In otitis media in dogs Good to Excellent results were obtained in 4 (40 percent) of 10 ears, and Fair results (moderate improvement) in 4 ears.

In these dogs, duration of treatment as determined by dates of clinical examination was reported for 299 of 318 ears in which the medication was effective in otitis externa or otitis media. Range of duration was from two days to five months. In 59 ears (19.7 percent) treatment was continued for 7 days or less; in 153 ears (51.2 percent) for 8 to 30 days, and in 87 ears (29.1 percent) for 31 days or more.

In cats with otitis externa, Good to Excellent results were obtained in all of 28 ears treated with the medication. Duration of treatment, as determined by dates of clinical examination in 27 ears for which it was reported, was one to 62 days with an average of 18 days.

TABLE 2.—RESULTS OF TREATMENT IN 235 DOGS (354 EARS) AND 22 CATS (28 EARS)

| Species and Conditions Treated | Number of Animals | Number of Ears | Results | | |
|---|---|---|---|---|---|
| | | | Good to Excellent | Fair | Ineffective |
| Dogs: | | | | | |
| Chronic otitis externa | 89 | 140 (100%) | 99 (70.7%) | 13 (9.3%) | [1] 28 (20%) |
| Acute otitis externa | 138 | 204 (100%) | 183 (89.7%) | 6 (2.9%) | 15 (7.4%) |
| Total otitis externa | 227 | 344 (100%) | 282 (82.0%) | 19 (5.5%) | 43 (12.5%) |
| Otitis media | 9 | 10 (100%) | 4 (40.0%) | 4 (40.0%) | 2 (20%) |
| Total Dogs | [2] 236 | 354 (100%) | 286 (80.2%) | 23 (9.6%) | 45 (10.2%) |
| Cats: | | | | | |
| Otitis externa | 22 | 28 (100%) | 28 (100%) | | |
| Total Animals | [2] 258 | 382 (100%) | 314 (82.2%) | 23 (6.0%) | 45 (11.8%) |

[1] Investigators reported that surgery was indicated in 8 ears; probable fungus infection in 2 ears, and that owner probably did not administer the drops in 2 ears.
[2] One dog treated for otitis externa in one ear and otitis media in the other.

In clinical trials in humans to establish the safety and effectiveness of the new solution containing neomycin undecylenate, tyrothricin, hydrocortisone, ethyleneoxide polyoxypropylene glycol condensate, in propylene glycol, inhumans, the solution was administered to 850 patients by 28 investigators. Of these, two patients were dropped from the study because of sensitivity to neomycin, and one because of an apparent concurrent allergic reaction to eggs. Sixty additional patients were dropped because of incomplete follow-up data. Of the remaining 787 patients, 366 were male and 421 were female. One of these patients were treated on two occasions. Fifteen of the patients were less than 2 years old, 127 were from 2 to 14 years old, 365 were from 15 to 50 years old, and 150 were more than 50 years old. The precise ages of 136 patients were not reported. Among these 787 patients, 548 (including as 2 patients, one patient who was treated on two separate occasions) had otitis externa (679 ears); 202 had otitis media (216 ears) and in 40 the medication was used for cleansing of 41 postoperative cavities following mastoidectomy, fenestration or stapedectomy (two of the patients were treated for otitis media in one ear and for infections of postoperative cavities in the other at the same time).

In chronic and acute otitis externa, 679 ears of 548 patients were treated. These included cases of otitis externa sicca, purulent, weeping, exudative, eczematic, with furuncles, or seborrheic dermatitis. Good to excellent clinical results were reported in 580 ears (85.56 percent; poor results or only moderate improvement in 56 ears (8.25 percent); no change in 38 ears (5.6 percent), and worsening in 4 ears (0.59 percent) (Table3). Duration of therapy was reported for 628 of these ears with otitis externa. In 333 ears (53.02 percent) of those reported treatment continued for from 1 to 7 days; 134 ears (21.34 percent) were treated for from 8 to 14 days; 100 ears (15.92 percent) were treated for from 15 to 30 days; 57 ears (9.08 percent) were treated for from 31 to 100 days; 4 ears were treated for 115 days, 102 days, 6 months, and 10 months, respectively (Table 4).

Of the 216 ears of 202 patients treated for chronic or acute otitis media, many were complicated with otitis externa. Cases of both serous and purulent otitis media were treated, and cholesteatoma or mastoid involvement was reported in many. Chronic cases had histories of up to 40 years. Clinical results were Good to Ecellent in 173 ears (80.09 percent); Poor or only Moderate improvement in 34 ears (15.74 percent); no change in 8 ears (3.71 percent); and worse in 1 ear (Table 3). Duration of therapy was reported for 180 ears with otitis media. In 87 of these ears (48.33 percent) therapy was applied for from 1 to 7 days; in 32 (17.78 percent) from 8 to 14 days; in 31 (17.22 percent) from 15 to 30 days and in 30 for more than 30 days (see Table 4).

The new medication was used for cleansing of 31 postoperative aural cavities, both recent and long-standing, with a variety of infections. Good to Excellent clinical results were reported in 28 ears (68.30 percent); Poor to Moderate improvement in 3 (7.31 percent), and no change in 10 (24.39 percent) (see Table 3). While treatment was continued for some beyond the period of the study, duration of therapy was reported for 30 ears. In 23 of these 30 ears (76.67 percent) therapy was continued for 30 days or less. The longest period of therapy was 9 months for one ear (see Table 4).

TABLE 3.—RESULTS OF TREATMENT OF 936 EARS OF 787 PATIENTS WITH A TEST SOLUTION CONTAINING NEOMYCIN UNDECYLENATE, TYROTHRICIN, HYDROCORTISONE, ETHYLENE OXIDE POLYOXYPROPYLENE CONDENSATE IN PROPYLENE GLYCOL

| | Number of patients | Number of ears treated | Results | | | | |
|---|---|---|---|---|---|---|---|
| | | | Excell. | Good | Mod. or poor | Unchanged | Worse |
| Otitis externa | 548 | 679 (100%) | 271 (39.9%) | 310 (45.65%) | 56 (8.25%) | 38 (5.60%) | 4 (0.59%) |
| Otitis media | 202 | 216 (100%) | 91 (42.13%) | 82 (37.96%) | 34 (15.74%) | 8 (3.71%) | 1 (0.46%) |
| Cleansing of postoperative cavities | 40 | 41 (100%) | 14 (34.15%) | 14 (34.15%) | 3 (7.31%) | 10 (24.39%) | |
| Totals | ¹ 790 | 936 (100%) | 376 (40.17%) | 406 (43.37%) | 93 (9.94%) | 56 (5.98%) | 5 (0.54%) |

¹ 2 patients were treated for otitis media in one ear while treatment of a postoperativ) cavity was given in the other. One patient was treated twice for otitis externa.

TABLE 4.—DURATION OF THERAPY IN 838 EARS WITH A TEST SOLUTION CONTAINING NEOMYCIN UNDECYLENATE, TYROTHRICIN, HYDROCORTISONE, ETHYLENE OXIDE POLYOXYPROPYLENE CONDENSATE IN PROPYLENE GLYCOL

| Days Therapy | Otitis Externa | Percent | Otitis Meida | Percent | Cleansing of Postoperative Cavity | Percent |
|---|---|---|---|---|---|---|
| Up to 7 | 333 | 53.02 | 87 | 48.33 | 5 | 16.67 |
| 8–14 | 134 | 21.34 | 32 | 17.78 | 8 | 26.67 |
| 15–30 | 100 | 15.92 | 31 | 17.22 | 10 | 33.33 |
| 31–60 | 46 | 7.32 | 23 | 12.78 | 4 | 13.33 |
| 61–80 | 7 | 1.12 | 3 | 1.67 | 1 | 3.33 |
| 81–100 | 4 | 0.64 | 2 | 1.11 | | |
| 100 | ¹ 4 | 0.64 | ² 2 | 1.11 | ³ 2 | 6.67 |
| | 628 | 100.00 | 180 | 100.00 | 30 | 100.00 |

¹ 115 days; 102 days; 6 months; 10 months.
² 120 days; 125 days.
³ 120 days; 9 months.

One group of investigators used the new test solution containing neomycin undecylenate, tyrothricin, hydrocortisone, ethylene oxide polyoxypropylene condensate in propylene glycol in a series of 54 patients. One patient was removed from the study because of sensitivity to the medication, confirmed by patch test. Of the remaining 53 patients, 20 were male and 33 female, ranging in age from 5 to 89 years. In these patients, 63 ears of 46 patients were treated for otitis externa, 7 ears of 6 patients for otitis media, and 1 ear for an infection of a postmastoidectomy cavity. The wick method of treatment was used with a cotton pledget inserted in the ear and moistened at varying intervals for each patient with from 2 to 6 drops of the medication.

Clinical results were Good to Excellent in 51 (80.95 percent) of the 63 ears treated for otitis externa; Moderate in 6 (17.46 percent); Unchanged in 5 (1.59 percent), and Worse in 1. These results were obtained after an average duration of treatment of 21 days; the longest duration of treatment was 63 days; and the shortest was 4 days. In the 7 ears treated for otitis media, results were Good to Excellent in 6, and the ear was Worse in 1 case. The average duration of treatment in these 7 ears was 27 days. In the ear treated for discharge in a postoperative cavity, the result was moderate improvement after 28 days of treatment.

In this series, cultures were grown from the exudate of 37 ears of 34 patients with otitis externa. *Staphylococcus albus* was grown from the exudate of 16 ears; *Staphylococcus aureus* from 4; hemolytic *Staph. aureus* from 14; nonhemolytic *Sterptococcus* from 4; *Strep. viridans* from 3; *Bacillus proteus* from 4; *Diplococcus pneumoniae*, *Aerobacter aerogenes*, diphtheroids, *Pseudomonas aeruginosa*, and *Escherichia coli* from 2 each, and *Aspergillus*

*niger* and Candida from one each. Clinical results were good to excellent in these ears except for moderate to poor results in 1 ear from which *Staph. aureus* was cultured, and in 2 ears from which both *Staph. aureus* and *Staph. albus* were cultured. Cultures were also grown from the exudate of 2 ears with otitis media. Good clinical results were obtained in both these ears, from which *A. aerogenes* and diphtheroids, respectively, were cultured.

A second investigator, using the same test solution containing neomycin undecylenate, tyrothricin, hydrocortisone, ethylene oxide polyoxypropylene glycol condensate in propylene glycol treated 29 ears of 25 patients. Of these patients, 13 were male and 12 female, and they ranged in age from 2 months to 80 years. The dosage used was 2 drops three times daily by the wick method. Cultures were taken from 27 of these ears at the time therapy was initiated. From these cultures were grown *P. aeruginosa* (11 ears); *Staph. albus* (6 ears); *Staph. aureus* (3 ears, coagulase positive in 2); diphtheroids (6 ears); micrococci sp., saprophytic (2 ears); *Bacillus subtilis*; *Proteus vulgaris*; *E. coli*; Candida sp. (not *C. albicans*), *Klebsiella pneumoniae*, *Sarcina lutea* (1 ear each). From some ears more than one pathogenic microorganism was cultured.

Fifteen ears of 12 patients with otitis externa were treated with Good to Excellent results in all. Treatment of 10 ears of 10 patients with otitis media gave Good to Excellent results for 8. No improvement was noted for two patients with otitis externa, 67 and 75 years old, respectively, who reported a recurrent foul discharge from the ear since childhood. In one infant of 2 months, with a greenish discharge and a small marginal perforation of the tympanum, *P. aeruginosa* was cultured from the exudate. With the application of 2 drops of the medication three times daily, the discharge lessened progressively and ceased after 9 days of treatment. The therapy was continued for 11 days, at which time the drum perforation was healed. In another infant, 7 months old, with recurrent discharge from the ear for three months, which had proved unresponsive to systemic antibiotics (oral and intramuscular) *Staph. aureus* coagulase positive was cultured from the exudate. The discharge ceased 14 days after institution of therapy, and a pinpoint central perforation of the drum healed thereafter. Three ears of 3 patients were treated for discharge from post-mastoidectomy cavities. In one cavity, from which *P. aeruginosa* was cultured, an Excellent result was obtained, the discharge ceasing in 28 days of treatment. In the other two cavities, dating from operations 2 and 24 years previous to treatment, respectively, some lessening of the discharge was noted, but the results were rated Poor after 14 and 20 days of therapy, respectively.

Another investigator also administered the test solution, containing neomycin undecylenate, tyrothricin, hydrocortisone, ethylene oxide polyoxypropylene glycol condensate in propylene glycol, to 53 patients, 28 male and 25 female, with otitis externa or otitis media, or for cleansing of postoperative cavities. Their ages were from 4 to 87 years. Thirteen were less than 14 years old, 31 were from 14 to 50 years old, and 9 were more than 50 years old. Twenty-six ears of 24 patients were treated for otitis externa, 23 ears of 21 patients for otitis media, and 9 ears of 8 patients for cleansing of postoperative cavities. The dosage varied, but in most cases 2 drops of the test solution were administered every 4 hours.

In otitis externa, Good to Excellent results were obtained in 22 of the 26 ears of 24 patients treated, Poor results in 1, and the condition remained unchanged in 4. Duration of therapy was from 4 to 21 days. Cultures were made before treatment from the exudate of 24 of these ears. Good to Excellent results were obtained in 7 ears which yielded cultures of *Staph. aureus*, 5 ears with *P aeruginosa*, 4 with *A. niger*, and 1 each with *P. vulgaris* and hemolytic Streptococci. There was a Poor result in one ear with *Staph. albus,* and no improvement in 2 with *P. aeruginosa* and 2 with *A. niger*. In one ear, in which otitis externa was due to trauma, the culture was sterile.

In otitis media, Good to Excellent results were obtained in all 23 treated ears of 21 patients, following therapy for periods ranging from 4 to 14 days. Cultures were made from the exudate of 21 ears of 19 patients, before treatment. These cultures grew *Staph. albus* (7 ears); hemolytic Streptococci (6 ears); Pneumococci Type III (2 ears); *P. aeruginosa* (2 ears); and *Staph. aureus, P. vulgaris,* and *Neisseria catarrhalis* (1 ear each). The culture from one ear was sterile.

Good to Excellent clinical results were obtained in the use of the medication for cleansing of post-operative cavities in 8 of 9 ears. No improvement was noted after 29 days of therapy in 1 post-mastoidectomy cavity in which *Staph. albus* was cultured from the exudate. In three other post-mastoidectomy cavities in which Good clinical results were obtained, *P. vulgaris* was cultured from the exudate of 1, *Staph. albus* from the second, and both hemolytic Streptococci and *Staph. aureus* from the third cavity, which had exhibited recurrent discharge for 35 years. Excellent and Good clinical results, respectively, were obtained in the treatment of 2 post-fenestration cavities from which *P. vulgaris* was cultured, and Excellent results in a post-stapedectomy cavity from the exudate of which *Staph. albus* was cultured in 2 ears of 1 patient treated for discharge from post-mastoidectomy cavities, from the exudate of which no cultures were made, the odor changed after one week of therapy, the granulating tissue appeared to be controlled, and after 24 days an Excellent result was noted. Duration of therapy in these 9 ears was from 4 to 29 days.

The following examples illustrate the present invention:

Example 1

To 700 cc. of glycerin, in a glass flask, is added 10 gms. of Pluronic F–68 and 5 gm. of chlorbutanol U.S.P. Pluronic F–68 is a typical member of the group of ethyleneoxide-polypropyleneglycol condensates and has a molecular weight of between 1500 and 1800 for the polyoxypropyleneglycol base unit, which comprises essentially between 10 percent and 20 percent of the total molecular weight of the molecule, and also contains from 80 percent to 90 percent of ethylene oxide moieties. The overall molecular weight of the compound is approximately 8000. Pluronic F–68 is a free-flowing white flake with a slight characteristic odor, having a melting point of at least 50° C., and a pH of betwen pH 6 and pH 8 for a 2.5 percent solution, at 25° C. This compound is non-toxic and non-irritating to the skin. The mixture is stirred and to this solution is added 30 cc. of distilled water. After complete solution is achieved, the mixture is filtered and brought to a volume of 1 liter with additional glycerin. The solution is then subdivided into small units, as for example, 8 cc. bottles, for dispensing.

Although a preferred concentration of the ethyleneoxide-polyoxypropyleneglycol condensate used is described as 1.0 percent (w./v.), the range of concentration for this agent may be from 0.5 to 3 percent (w./v.). Similarly, the range of concentration of water to be added may be from 1 to 10 percent, by volume. It should be noted also, under certain conditions, depending upon the specific aural pathology present, that a completely anhydrous solution may be desired, in which case the step of adding the water is omitted.

Example 2

To 50 cc. of propylene glycol, contained in a glass reaction vessel, is dissolved 1 gram of the ethyleneoxide-polyoxypropyleneglycol condensate which is known in the trade as "Pluronic F–68." The mixture is stirred; warmed gently (not above 30° C.) and to this solution is added tyrothricin, 100 mg.; hydrocortisone alcohol 100 mg.; and 6.7 mg. of neomycin base moiety (as contained in neomycin undecylenate). The mixture is stirred and 30 cc. of propylene glycol are added, and 10 cc. of water. The solution is filtered and brought to 100 cc. volume with additional propylene glycol.

While the concentration of tyrothricin, hydrocortisone alcohol, neomycin and "Pluronic F-68" (a typical ethyleneoxide-polyoxypropyleneglycol condensate) given above, are preferred concentrations it should be noted that other concentrations of these therapeutically active ingredients may be required, depending upon the individual patient needs. Thus, the range of concentration of tyrothricin may be from 0.05 to 0.5 percent (w./v.); hydrocortisone alcohol may be from 0.05 to 0.5 percent (w./v.); neomycin base may be from 0.1 to 5.0 mg. per cc. of solution; and "Pluronic F-68," 0.5 to 3 percent (w./v.).

Example 3

To 50 cc. of propylene glycol, conttined in a glass reaction vessel, is dissolved 1 gm. of an ethyleneoxide-polyoxypropyleneglycol condensate, a representative member of which is known in the trade as "Pluronic F-68." The mixture is stirred; warmed gently (not above 30° C.) and to this solution is added tyrothricin, 100 mg. The mixture is stirred and 30 cc. of propylene glycol are added, and 10 cc. of water. The solution is filtered and brought to 100 c. volume with additional propylene glycol.

The range in concentration of the tyrothricin used may be varied, depending upon the individual patient needs and may be used in a range of from 0.05 to 0.5 percent (w./v.).

Example 4

To 50 cc. of propylene glycol, contained in a glass reaction vessel, is dissolved 1 gm. of the ethyleneoxide-polyoxypropyleneglycol condensate, which is known in the trade as "Pluronic F-68." The mixture is stirred; warmed gently (not above 30° C.) and to this solution is added hydrocortisone alcohol, 100 mg. The mixture is stirred and 30 cc. of propylene glycol are added, and 10 cc. of water. The solution is filtered and brought to 100 cc. volume with additional propylene glycol.

The range in concentration of the hydrocortisone alcohol may be varied, depending upon the individual patient needs and may be used in a range of from 0.05 to 0.5 percent (w./v.).

Example 5

To 50 cc. of propylene glycol, contained in a glass reaction vessel, is dissolved 1 gm. of ethyleneoxide-polyoxypropyleneglycol condensate, which is known in the trade as "Pluronic F-68." The mixture is stirred; warmed gently (not above 30° C.) and to this solution is added 66.7 mg. of neomycin base moiety as contained in neomycin undecylenate. The mixture is stirred and 30 cc. of propylene glycol are added, and 10 cc. of water. The solution is filtered and brought to 100 cc. volume with additional propylene glycol.

The range in concentration of the neomycin base moiety will vary depending upon the individual patient needs and may be used in a range of from 0.01 to 0.5 percent (w./v.).

Example 6

To 80 gm. of polyoxyethyleneglycol, having a molecular weight of 400 (known in the trade as "Carbowax") is added 3 gm. of "Pluronic F-68" (a preferred ethyleneoxide-polyoxypropyleneglycol condensate). The mixture is warmed slightly (not above 40° C.). The filtrate is brought to a weight of 100 gm. with additional polyoxyethyleneglycol-400. Should it be desired to add a preservative, then from 0.1 to 0.5 percent, by weight, of methyl and propyl parabens, U.S.P., may be utilized. The solution is subdivided into smaller units for dispensing and may be used to remove cerumen by instillation into the ear.

Example 7

A mixture of 10 mg. hydrocortisone alcohol; tyrothricin, N.F., 10 mg., 6.67 mg. neomycin base moiety (as contained in neomycin undecylenate) are triturated, while 100 mg. of Pluronic F-68 (ethyleneoxide-polyoxypropyleneglycol condensate) is slowly added. When an intimate mixture has been obtained, 5 cc. of propylene glycol are added slowly and the whole triturated. This is then followed with 1 cc. of distilled water and the whole brought up to a volume of 10 cc. with glycerin. The resulting solution may then be used to treat otitis externa by instilling 1 to 5 drops into the ear canal, from 1 to 4 times daily.

Example 8

In place of the glycerin used in Examples 1 and 7 above, there may be substituted from 1 to 100 percent of the amount of glycerin described in those examples, propylene glycol or a member of the group of polyoxyethylene glycols ranging in molecular weight from 200 to 600 and which are known in the trade as "Carbowaxes," or mixtures of these.

In place of the propylene glycol used in Example 2 and Example 7, above, glycerin or a member of the group of polyoxyethylene glycols ranging in molecular weight from 200 to 600 and which are known in the trade as "Carbowaxes," or mixtures of these, may be substituted in amounts of from 1 to 100 percent of the quantity of propylene glycol used.

In place of the polyoxyethylene glycol used in Example 6, glycerin or propylene glycol, or another member of the group of polyoxyethylene glycols ranging in molecular weight from 200 to 600, which are known in the trade as "Carbowaxes" or mixtures of these may be substituted in amounts of from 1 to 100 percent of the quantity of polyoxyethylene glycol used.

Example 9

In place of the tyrothricin used in Examples 2 and 7 above, there may be substituted polymyxin B., U.S.P., from 5000 to 15,000 units per cc.: tetracycline, U.S.P., from 10 to 100 mg./per cc.: dihydrostreptomycin U.S.P. from 0.5 to 2.5 mg./cc.: oxytetracycline, N.F., from 1 to 10 mg./cc.: chloramphenicol, U.S.P. from 0.1 to 1 percent (w./v.) and chlortetracycline, U.S.P. from 1 to 10 mg./cc. The remainder of the steps being the same.

In place of the cortisone alcohol used in Example 2 and Example 7 above, there may be substituted glycyrrhetinic acid, in from 2 to 5 percent concentration; Prednisolone, U.S.P., in from 0.5 to 1.5 mg./cc. of solution and Antipyrine, N.F., in from 3 to 5 percent concentration. The remainder of the steps being the same.

Example 10

To 50 cc. of propyleneglycol in a glass reaction vessel is added 1 gm. of ethylene oxide polyoxypropyleneglycol condensate, which is known in the trade as "Pluronic F-68." The mixture is stirred and then this solution is added 10 percent by weight of choline salicylate. The mixture is filtered and the volume brought up to 100 cc. with propyleneglycol.

The range in concentration of choline salicylate may vary from 1 to 20 percent by weight. In place of the choline salicylate there may be susbtitued N-methylglucammonium salicylate and salicylamid in concentrations of from 1 to 20 percent by weight.

Example 11

To 50 cc. of propyleneglycol is added 1 gm. of ethylene oxide polyoxypropyleneglycol and the mixture stirred until a clear solution results. To this clear solution is then added 0.1 percent by weight of tyrothricin; 0.067 percent by weight of neomycin undecylenate and 0.1 percent by weight of hydrocortisone. The mixture is stirred until complete solution is achieved and 25 cc. of propyleneglycol added. The mixture is filtered and diluted with 10 cc. of water and the volume brought to 100 cc. The resultant solution is a clear, homogeneous solution, useful to treat ear disease by instillation into the ear canal.

Example 12

When it is desired to remove excess cerumen from the ear canal, then this may be conveniently accomplished by instilling a solution, prepared according to Examples 1 through 7 above, so as to fill the ear canal. The ear canal is then stoppered with a cotton plug and the solution allowed to remain in situ for a period of time, from 10 minutes to 24 hours, and then the ear gently flushed with warm water. The ear wax is washed from the surface of the ear canal without causing local irritation or sensitivity reactions.

Example 13

When it is desired to treat otitis media or otitis externa, then a solution, as described in Examples 2, 6, 7 or 9 above, may be utilized for this purpose. One to five drops of the selected solution is instilled into the ear canal from one to four times daily. The ear canal should be stoppered with a cotton plug. There is prompt relief of the symptoms associated with otitis media and otitis externa. The instillation of therapeutic solution is not accompanied by sensitivity reactions nor specific allergic responses even on repeated application.

What is claimed is:

1. The method of removing cerumen which comprises the steps of introducing into the ear canal of humans and animals a composition containing a pharmaceutically acceptable water miscible hygroscopic organic solvent selected from the group consisting of propylene glycol, glycerin and polyoxyethylene glycol having a molecular weight of from 200 to 2600, in which there is dissolved from 5 to 30 mg. per ml. of ethylene oxide polyoxypropylene glycol condensate having a molecular weight of substantially 8750 allowing said to remain in situ for a period of at least 10 minutes and then gently flushing the ear canal with water.

2. The method of claim 1, said composition further containing, a compound selected from the group consisting of tyrothricin, 0.05 to 0.5 percent, neomycin base, 0.01 to 0.5 percent, hydrocortisone, 0.05 to 0.5 percent, choline salicylate, 1 to 20 percent, N-methyl glucammonium salicylate, 1 to 20 percent, salicylamide, 1 to 20 percent and mixtures of these.

3. The method of removing cerumen as described in claim 1, said composition further containing 1 to 20 percent by weight of choline salicylate.

4. The method of removing cerumen as described in claim 1, said composition further containing 1 to 20 percent by weight of N-methylglucammonium salicylate.

5. The method of removing cerumen as described in claim 1, said composition further containing 1 to 20 percent by weight of salicylamide.

6. The method of treating ear disease in humans and animals which comprises the steps of introducing into the diseased ear from 1 to 5 drops of a composition containing a pharmaceutically acceptable water miscible hygroscopic organic solvent selected from the group consisting of propylene glycol, glycerin and polyoxyethylene glycol having a molecular weight of from 200 to 600 in which there is dissolved from 5 to 30 mg. per ml. of ethylene oxide polyoxypropylene glycol condensate having a molecular weight of substantially 8750 and from 1 to 10 percent by weight of water, and a pharmacologically active compound selected from the group consisting of tyrothricin, 0.05 to 0.5 percent, neomycin base from 0.01 to 0.5 percent, hydrocortisone, 0.05 to 0.5 percent, choline salicylate, 1 to 20 percent, N-methyl glucammonium salicylate, 1 to 20 percent, salicylamide, 1 to 20 percent and mixtures of these, from 1 to 8 times daily.

7. The method of treating ear disease in humans and animals of claim 6, said pharmacologically active compounds being tyrothricin, 0.1 percent, neomycin undecylenate, 0.067 percent and hydrocortisone 0.1 percent.

8. The method of claim 6, said pharmacologically active compound being choline salicylate from 1 to 20 percent by weight.

9. The method of claim 6, said pharmacologically active compound being N-methyl glucammonium salicylate from 1 to 20 percent by weight.

References Cited

UNITED STATES PATENTS

| 2,854,378 | 9/1958 | Buckwalter | 167—58 |
| 2,914,442 | 11/1959 | Halpern | 167—58 |
| 2,975,099 | 3/1961 | Gozan et al. | 167—58 |

OTHER REFERENCES

Lesshafft et al.: Drug Standards, vol. 25, pp. 45–50, Mar. 4, 1957, 167–58.

Senturia et al.: The Laryngascope, vol. 57, No. 10, pp. 633–639 and 649–654, October 1947, 167–58.

RICHARD L. HUFF, *Primary Examiner.*

U.S. Cl. X.R.

424—343, 177, 235, 181, 243, 227